June 25, 1968  F. L. CAVALLERI  3,389,808
CLOTHESLINE

Filed April 20, 1966  2 Sheets-Sheet 1

INVENTOR.
FRANK LOUIS CAVALLERI
BY
Richards y Geier
ATTORNEYS

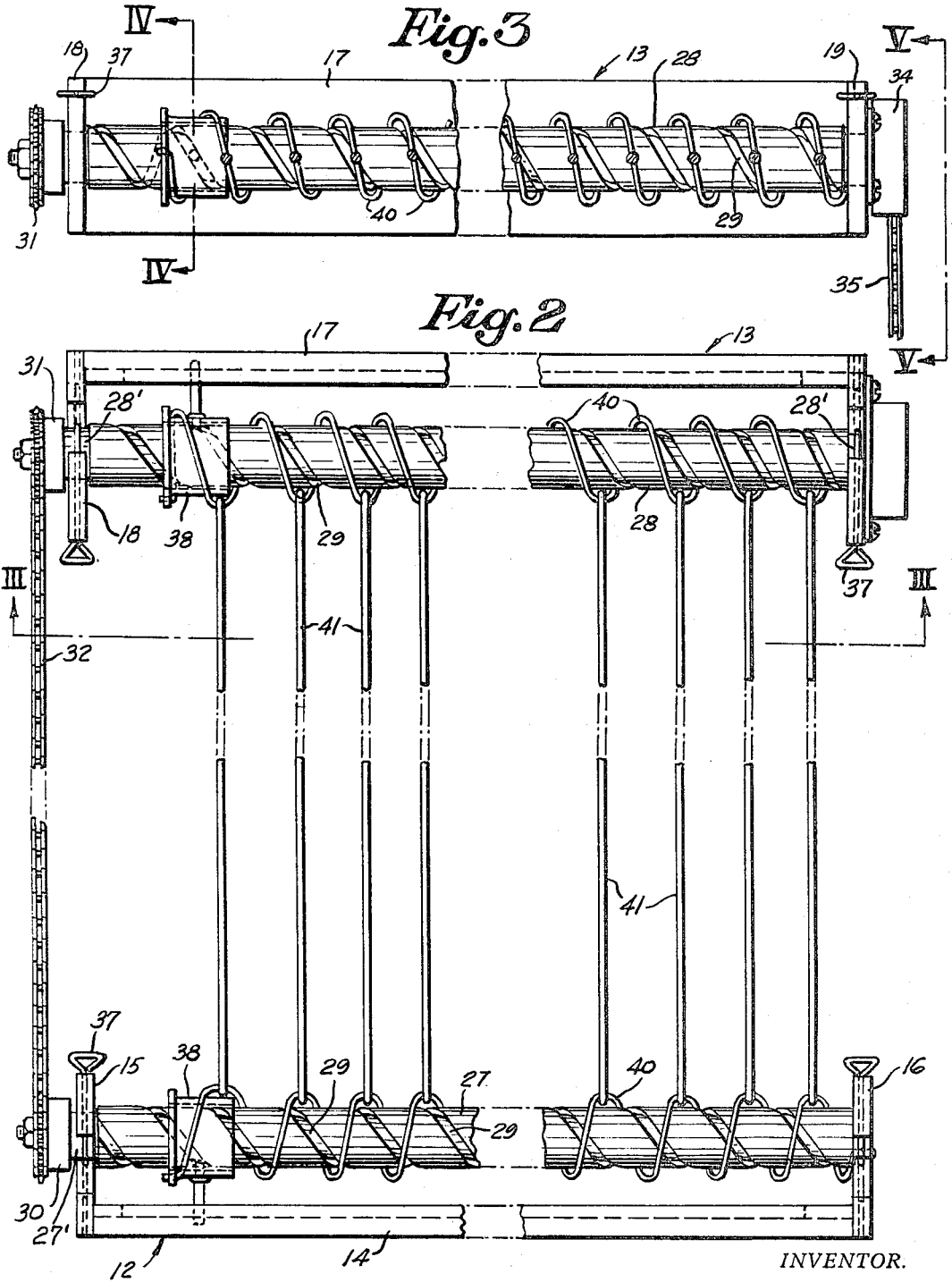

8 United States Patent Office 3,389,808
Patented June 25, 1968

3,389,808
CLOTHESLINE
Frank Louis Cavalleri, 760 67th St.,
Brooklyn, N.Y. 11220
Filed Apr. 20, 1966, Ser. No. 543,888
7 Claims. (Cl. 211—119.16)

ABSTRACT OF THE DISCLOSURE

A clothesline intended for use in a bathroom or similar inner space has two aligned brackets fixed to opposite walls. Each bracket carries a rotary shaft provided with helical grooves and carrying helically wound wires, the lines being attached to the wires so that they extend in parallel relationship between the two shafts. The two shafts are interconnected by a gear drive which may be operated manually by a downwardly hanging chain so that the shafts will rotate jointly in the same direction. A sleeve is mounted on each shaft. Each sleeve carries a pin, one end of which extends into the helical groove of the shaft while the other end is located in an elongated slit extending the entire length of the bracket. One end of each helically wound wire is connected to its sleeve while the other end is connected to an end of its bracket. The user by pulling the chain will be able to move the sleeves jointly upon the shafts, thereby contracting or expanding the helically wound wires and thus moving the parallel lines closer to each other or away from each other.

---

This invention relates to a clothesline and refers more particularly to a clothesline suited for use indoors in confined spaces.

In my Patent No. 3,164,258, issued Jan. 5, 1965, I have described a clothesline of this type which can be extended and retracted by lazy-tongs mechanisms.

An object of my present invention is to improve this construction by replacing the lazy-tongs mechanisms by other devices which are less expensive to manufacture and are easier to install and operate.

Another object is the provision of an indoors clothesline which is particularly suitable for installation in bathrooms and which will in no way interfere with or be affected by the normal use of the shower and bathtub.

Other objects of the present invention will become apparent in the course of the following specification.

In the accomplishment of the objectives of the present invention it was found desirable to provide two elongated brackets preferably made of wood or plastics, which are mounted in alignment with each other on opposite walls of a bathroom or other indoor space. Each bracket carries a rotary shaft provided with helical grooves. A sleeve is mounted on each shaft and carries a pin extending into the groove. The other end of the pin may be guided in an elongated slit provided in the bracket. A wire is wound helically around each shaft but is somewhat spaced from the outer surfaces of the shaft. One end of the wire is attached to the sleeve while the other end is fixed to one end of the bracket. Parallel ropes or lines used to carry the wet-wash extend between the wires. Adjacent ends of the two shafts are joined by a chain transmission or the like. Another end of one of the shafts carries a downwardly extending chain.

A user, by pulling the downwardly extending chain, will be able to move the sleeves upon the shafts and thus to extend or contract the line-carrying wires. Consequently, a simple manipulation of the chain will suffice to either spread the lines uniformly along the brackets or to push them against a wall so that they will not interfere with the normal use of the indoor space. If the indoor space is a bathroom the shower and the bathtub can be used without any danger that splashing water will in any way effect the clothesline mechanism.

The invention will appear more clearly from the following detailed description when taken in connection with the accompanying drawings showing by way of example, a preferred embodiment of the inventive idea.

In the drawings:

FIGURE 2 is a top view of the clothesline, some parts being shown as broken off.

FIGURE 3 is a side view of one of the brackets taken along the line III—III of FIG. 2.

Similar parts are designated by the same numerals throughout the drawings.

Figure 1:
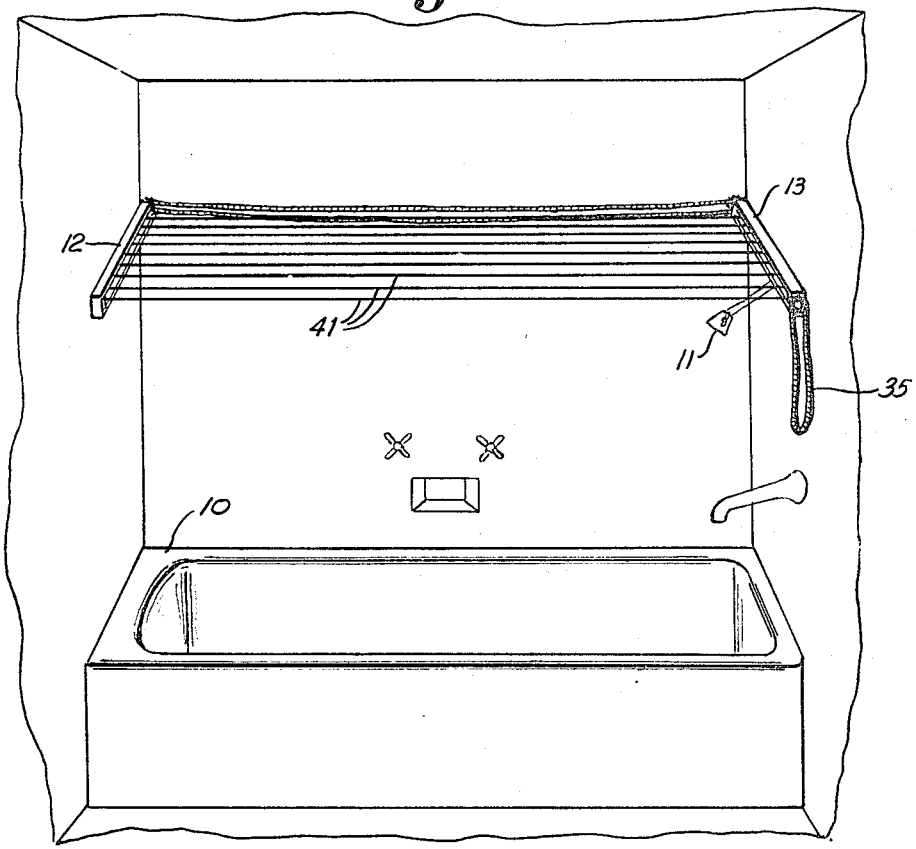
FIGURE 1 is a perspective view of a bathroom provided with a clothesline of the present invention.

The clothesline constituting the present invention is shown in FIG. 1 as being located above the bathtub 10 and the shower 11 of a bathroom.

Obviously, the clothesline may be located in any other desirable or available enclosed space.

Figure 4:
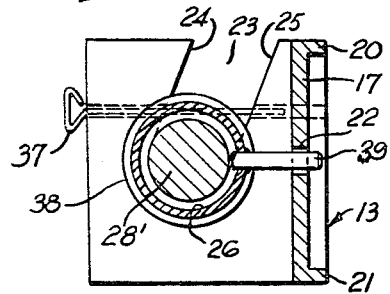
FIGURE 4 is a transverse section along the line IV—IV of FIG. 3.

The clothesline includes two elongated brackets 12 and 13 which are fixed to opposite walls of the room by any suitable means not shown in the drawings. The brackets extend in alignment with each other and are somewhat similar to each other in construction. The bracket 12 includes an elongated central plate 14 and two end plates 15 and 16 extending at right angles to the central plate and firmly connected therewith. The bracket 13 has a similar central plate 17 and two end plates 18 and 19. The central plates 14 and 17 may be provided with upper and lower ribs 20 and 21, respectively (FIG. 4). Elongated slits or grooves 22 extend the entire length of the central plates 14 and 17, being located substantially in the middle of the plates.

Each of the end plates 15, 18 and 19 has an opening 23 formed by inclined inner walls 24 and 25 joined by a rounded bottom portion 26.

A shaft 27 is carried by the bracket 12 and a similar shaft 28 is carried by the bracket 13. Each shaft is provided with comparatively deep and wide helical grooves 29 extending from end to end of the shaft. The shaft 27 has a reduced end portion 27' carried by the bottom of the opening provided in the end plate 15. The opposite end of the shaft 27 is rotatably mounted in the end plate 16. The shaft 28 has reduced portions 28' at opposite ends which extend through openings provided in the end plates 18 and 19 and are carried by the bottoms of these openings. The reduced end portion of the shaft 27 carries a gear wheel 30. The opposite end portion of the shaft 28 carries a gear wheel 31. The gear wheels 30 and 31 are joined by an endless chain 32.

Obviously, this chain transmission may be conveniently replaced by a belt transmission or the like.

Figure 5:
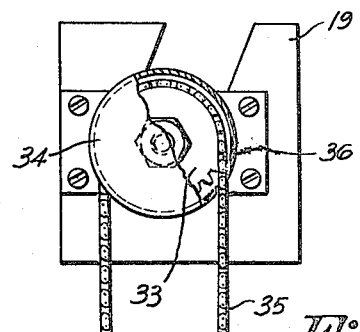
FIGURE 5 is an end view of one of the brackets taken along the line V—V of FIG. 3, some parts having been broken off.

The other end portion of the shaft 28 carries a gear wheel 33 enclosed in a casing 34 which is fixed by screws or the like upon the end plate 19 (FIG. 5). The gear wheel 33 carries an endless chain 35 which hangs downwardly through an opening 36 provided in the casing 34.

Pins 37 extend across the openings 23 of the end plates 15, 18 and 19 directly above the shafts 27 and 28. These pins prevent the shafts 27 and 28 from being pushed out of the openings 23.

Sleeves 38 are mounted opposite each other upon the shafts 27 and 28. Each sleeve 38 carries a pin 39 one end of which extends into the helical groove 29 of the shaft. The other end of the pin 39 extends into the elongated slit 22 provided in the central plate 14 or 17.

The pin 39 is firmly fixed to its sleeve 38 by soldering or the like.

Wires 40 are helically loosely wound around the shafts 27 and 28. One end of a wire 40 is firmly attached to a sleeve 38. The other end of the wire 40 is attached to an adjoining end plate, namely, the end of the wire 40 enclosing the shaft 27 is fixed to the end plate 16, while the end of the wire 40 enclosing the shaft 28 is fixed to the end plate 19. The wires 40 are mounted on their shafts sufficiently loosely, so that the ends of ropes or lines 41 may be attached to them. The lines 41 are preferably tied to the wires 40 in such manner that the lines extend parallel to each other between the brackets 12 and 13.

To operate the clothesline of the present invention the user merely pulls one of the two loop sections of the downwardly hanging chain 35. This pulling will turn the gear wheel 33 keyed to the shaft 28. The rotation of the shaft 28 will be transmitted through the gear wheel 31, the endless chain 32 and the gear wheel 30 to the shaft 27, so that the two shafts 27 and 28 will rotate in the same direction. Since the pins 39 of the sleeves 38 engage the grooves 29 of the two shafts, the sleeves 38 will move upon their shafts in directions which are determined by the directions of rotation of the shafts. Thus the sleeves 38 will either compress the helical wires 40 or pull them outwardly, with the result that the lines 41 will either move toward each other and toward adjacent ends of the brackets 12 and 13, or they will spread further apart until finally they will extend the entire length of the brackets, as illustrated in FIG. 1. Then they may be used conveniently for hanging the wet-wash. When there is no laundry to be dried and the user wants to take a shower, the chain 35 is operated until all the lines 41 are accumulated near the rear wall of the bathroom. It is apparent that the brackets 12 and 13 will in no way interfere with the use of the shower or bathtub. The brackets 12 and 13 and the parts connected therewith are preferably made of wood or of a plastic material so that they will not rust or be otherwise affected by water or steam.

It is apparent that the example described above has been given solely by way of illustration and not by way of limitation and that it is subject to many variations and modifications within the scope of the present invention. All such variations and modifications are to be included within the scope of the present invention.

What is claimed is:

1. A clothesline, comprising two parallel brackets mountable in spaced apart relationship, a separate shaft rotatably mounted in each bracket, means interconnecting said shafts for jointly rotating said shafts at the same speeds and in the same directions, each of said shafts having helical grooves, a separate sleeve mounted upon each shaft, a separate pin carried by each sleeve and extending into the helical groove of the shaft carrying the sleeve, a separate helical wire loosely enclosing each shaft and having one end fixed to a separate bracket and the other end to a sleeve, and clotheslines connected in spaced relation to said wires.

2. A clothesline in accordance with claim 1, wherein each bracket comprises an elongated guiding groove, each of said pins having an end extending into the guiding groove of a separate bracket.

3. A clothesline in accordance with claim 1, wherein each bracket comprises a central plate and two end plates extending at right angles to the central plate, each of said shafts being spaced from and extending parallel to the central plate and through the end plates of its bracket.

4. A clothesline in accordance with claim 3, wherein two end plates of one bracket and one end plate of another bracket have openings through which the ends of the shafts extend.

5. A clothesline in accordance with claim 4, comprising pins extending through said openings above said shaft ends.

6. A clothesline in accordance with claim 4, wherein the means interconnecting said shafts comprise wheels fixed to adjacent ends of the two shafts which extend through said openings, and an endless transmission interconnecting said wheels.

7. A clothesline in accordance with claim 6, wherein the means interconnecting said shafts further comprise a gear wheel fixed to another end of one of the two shafts, and an endless manually operable chain suspended from said gear wheel and meshing therewith.

References Cited
UNITED STATES PATENTS

| | | | |
|---|---|---|---|
| 523,315 | 7/1894 | Jodoin | 211—119.16 XR |
| 686,492 | 11/1901 | Verbeke et al. | 211—119.16 |
| 3,164,258 | 1/1965 | Cavalleri | 211—119.16 |

ROY D. FRAZIER, *Primary Examiner.*

WILLIAM D. LOULAN, *Assistant Examiner.*